Dec. 29, 1964
C. F. LEATHERS
3,163,704
WELDING CABLE WITH PRESSED LUGS
Filed June 20, 1963
3 Sheets-Sheet 1
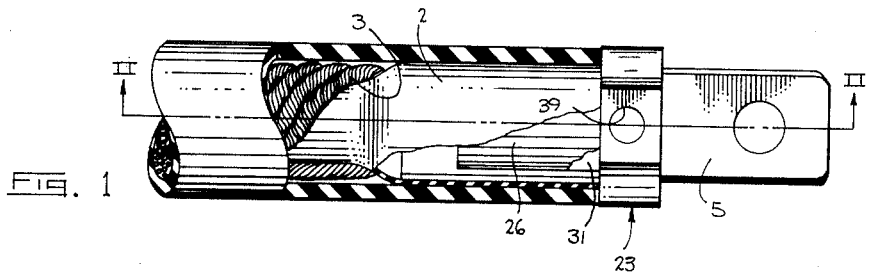
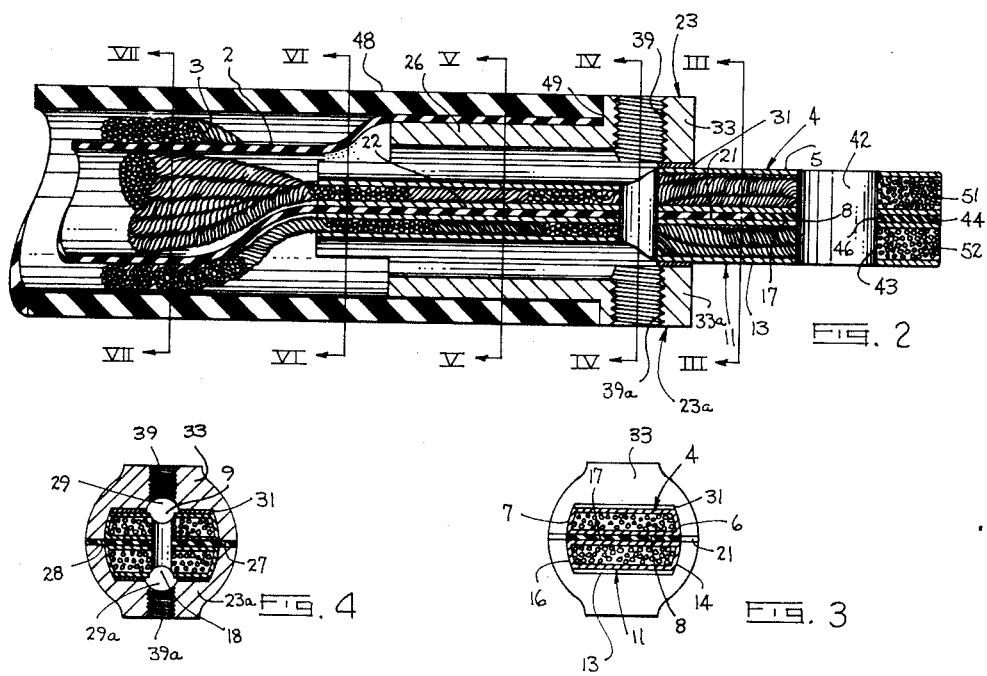
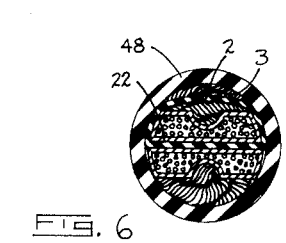
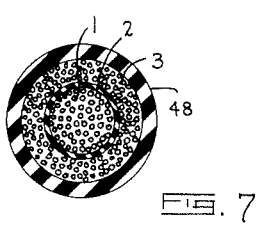
INVENTOR.
CHESTER F. LEATHERS
BY
Woodhams Blanchard by Flynn
ATTORNEYS

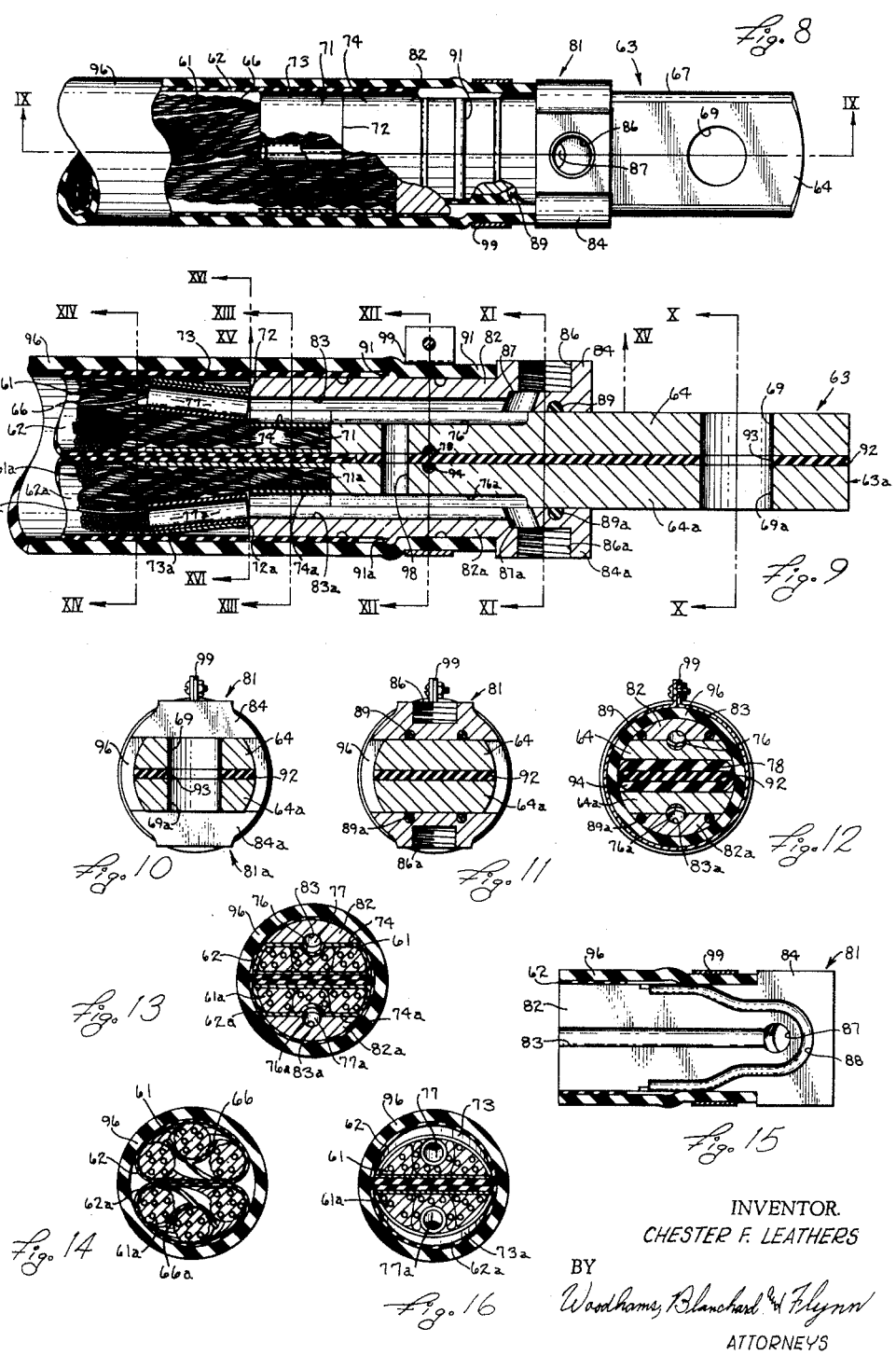

Dec. 29, 1964     C. F. LEATHERS     3,163,704
WELDING CABLE WITH PRESSED LUGS
Filed June 20, 1963     3 Sheets-Sheet 3
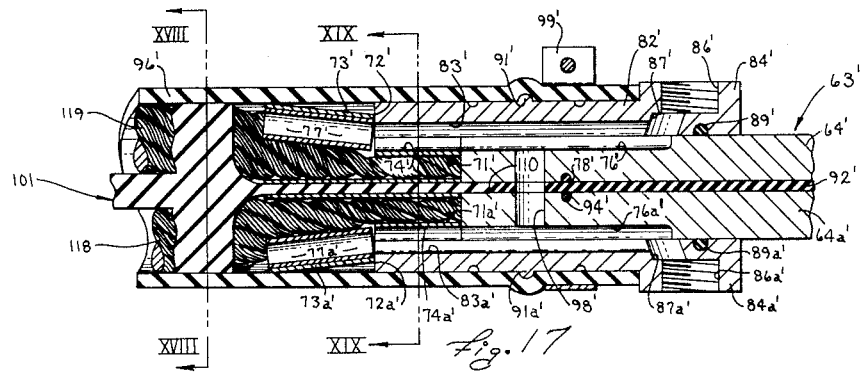
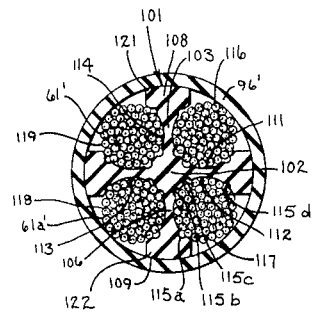
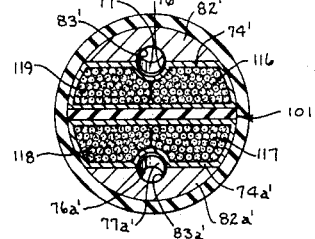
INVENTOR.
CHESTER F. LEATHERS
BY
Woodhams, Blanchard & Flynn
ATTORNEYS United States Patent Office 3,163,704
Patented Dec. 29, 1964

3,163,704
WELDING CABLE WITH PRESSED LUGS
Chester F. Leathers, Portage Township, Kalamazoo County, Mich., assignor to Cal Manufacturing Company, Kalamazoo, Mich., a partnership
Filed June 20, 1963, Ser. No. 289,791
17 Claims. (Cl. 174—15)

This invention relates to electrical cable construction and particularly to a type thereof adapted for carrying extremely high amperages between a pair of relatively movable terminals, such as from a transformer to a welding electrode associated therewith. This application is a continuation-in-part of my application Serial No. 1,311, filed January 8, 1960, now abandoned.

While the use of such cables has been known for a long time and the same are used in large numbers with resistance welding equipment, especially the type thereof known as gun welders, such cables have not been entirely satisfactory in view of their expense from the standpoints both of original cost and of necessary replacement. Many designs for such cables have been offered in the past and several of such designs have attained considerable commercial acceptance. However, insofar as I am aware, all of these cables have had relatively short periods of useful life for a variety of reasons. For example, many of such cables constitute a rope or other bundle of relatively small wires which are soldered or similarly fastened to a solid connecting lug. By so doing, bending forces occurring in the normal use of such cables are concentrated at the point where the soldered zone terminates and the unsoldered zone of the wires commences thereby causing excessive and repeated bending at that point and subsequent fatiguing and breakage of the metal comprising said wires.

Another problem arising from presently conventional constructions, is the necessity for more effective cooling of the conductive portions of the cable.

It has been previously recognized that deterioration of the relatively small wires comprising the usual wire rope cables is greatly hastened by the creation of high temperatures in the cable, particularly at the ends of the cable adjacent the lugs. Where such high temperatures are created and pieces of wire break and separate from the mass of the cable, such wires tend to move with the coolant into other portions of the cable where they often lodge and tend to clog the otherwise free flow of coolant. Thus, as the wires commence to break and clog the flow of coolant, the flow thereof is slowed and the cooling effect of said coolant is hindered. This permits a still higher temperature in the cable wires and still further causes deterioration of the wires and further breakage. Thus, once a deterioration and resulting breakage of the wires is commenced, it is self-generating and rapidly accelerating process and the cable rapidly comes to the end of its useful life.

Further, even if an adequate cooling system for the main body of the cable is provided, if the lugs themselves have a tendency to create excessive heating, the portions of wires connected directly thereto may be excessively heated and such breakage commences in spite of the effect of the cooling fluid. It has therefore long been desirable to provide a lug which generates relatively little heat and thereby, with the help of the cooling fluid, maintains the wires in a relatively cool condition.

Accordingly, the objects of the invention include:

(1) To provide a flexible electrical conductor having at least one end connecting lug, said lug and conductor being constructed and connected in a manner to provide a very high level of electrical conductivity therebetween.

(2) To provide a device, as aforesaid, which can be constructed relatively inexpensively and which can be maintained in good operating condition over a long period of time.

(3) To provide apparatus, as aforesaid, in which the resistance between the contact surfaces of the lugs and the wires of the cable are at a minimum so as to minimize the heat generation within said lugs and thereby minimize the transfer of the heat to the wires of the cable.

(4) To provide apparatus, as aforesaid, wherein by minimizing the transfer of heat to the wires constituting the cables, deterioration of said wires due to heating is minimized and the cable is capable of a long useful life.

(5) To provide a device, as aforesaid, capable of carrying high amperages while maintaining the conductor and connecting lug in a relatively cool condition.

(6) To provide a device, as aforesaid, which will provide a maximum of electrical contact between the elements comprising the conductor and the elements comprising the lug.

(7) To provide a device, as aforesaid, wherein the lug is of such composite construction that the electrically conductive portion thereof can be made of highly electrically conductive material, whereas other portions thereof which are not necessarily electrically conductive can be made of material having high-strength characteristics.

(8) To provide a device, as aforesaid, including a covering and protective casing of electrically nonconductive material which casing is solidly held at its end in normal operation but wherein the parts holding the end of the casing can be readily removed for assembly and disassembly purposes.

(9) To provide a device, as aforesaid, providing for easy and rapid flow of coolant along the lug and conductor for effecting cooling thereof.

(10) To provide a device, as aforesaid, wherein the conductor is formed of a plurality of small wires and wherein there will be a minimum of breakage of such small wires whereby to minimize the clogging by fragments of said wires of the coolant passageways.

Other objects of the invention will be apparent to the persons acquainted with devices of this general type upon reading the following disclosure and inspection of the accompanying drawings.

In the drawings:

FIGURE 1 is a top, partially broken view of a device embodying the invention.

FIGURE 2 is an enlarged central longitudinal sectional view taken on the line II—II of FIGURE 1.

FIGURE 3 is a sectional view taken on the line III—III of FIGURE 2.

FIGURE 4 is a sectional view taken on the line IV—IV of FIGURE 2.

FIGURE 5 is a sectional view taken on the line V—V of FIGURE 2.

FIGURE 6 is a sectional view taken on the line VI—VI of FIGURE 2.

FIGURE 7 is a sectional view taken on the line VII—VII in FIGURE 2.

FIGURE 8 is a top, partially broken view of an alternate structure embodying the invention.

FIGURE 9 is an enlarged central, longitudinal sectional view taken on the line IX—IX of FIGURE 8.

FIGURE 10 is a sectional view taken on the line X—X of FIGURE 9.

FIGURE 11 is a sectional view taken on the line XI—XI of FIGURE 9.

FIGURE 12 is a sectional view taken on the line XII—XII of FIGURE 9.

FIGURE 13 is a sectional view taken on the line XIII—XIII of FIGURE 9.

FIGURE 14 is a sectional view taken on the line XIV—XIV of FIGURE 9.

FIGURE 15 is a sectional view taken on the line XV—XV of FIGURE 9.

FIGURE 16 is a sectional view taken on the line XVI—XVI of FIGURE 9.

FIGURE 17 is a longitudinal, sectional view generally similar to FIGURE 9 and showing a further modification.

FIGURE 18 is a sectional view taken on the line XVIII—XVIII of FIGURE 17.

FIGURE 19 is a sectional view taken on the line XIX—XIX of FIGURE 17.

FIGURE 20 is an oblique view of a fragment of the means utilized in the embodiment of FIGURE 17 for separating the electrically conductive cables.

*General Description*

In general, the invention contemplates providing a pair of insulated flexible conductors and providing an end lug for same by placing a partially or entirely hollow, generally tubular, jacket of electrically conductive material over the ends of each of said conductors and then forming said tube into the desired shape for comprising the lugs. An electrically conductive binding material such as solder, is then provided within the lugs so formed to fasten said conductor respectively to the formed tubular members whereby to provide the desired lugs. Coolant headers are then placed on the respectively remote surfaces of said lugs and a combined coolant seal and an electrical insulator element is placed between said lugs. A flexible casing is then provided to cover the cable structure and extend over said lugs into overlapping position with said coolant headers. Preferably said casing encircles both of said headers and the lugs located between said headers for holding said headers, lugs and separator snugly in their assembled position.

*Detailed Description*

Referring now in more detail to the embodiment illustrated in FIGURES 1 through 7, it will assist a clear understanding of the invention to describe the structure of the device somewhat in terms of the process of fabrication. However, it will be recognized that such reference to such particular fabrication procedure is for illustrative purposes only, is intended to assist a full understanding of the invention and is in no sense intended to limit the scope of the invention herein concerned.

Starting with the inner conductor 1, same constitutes in this embodiment a conventional wire rope of suitably conductive material, such as copper, which rope is preferably of circular cross section. A tubular member 2 of an electrically insulative material and somewhat resilient character, such as synthetic or natural rubber, is arranged in telescoping relationship on and around said conductor and extends to a point close to the end of the conductor 1. A second conductor 3 is comprised of a plurality of relatively small strands arranged circumferentially around the exterior of the sleeve 2 and preferably twisted on said sleeve somewhat to improve the flexibility of the conductors. The strands comprising the second conductor 3 are preferably held temporarily in position by means, such as tape, during the subsequent fabrication of the lug structure hereinafter described.

A short tube 4 of copper or other conductive material is provided of length equal to the desired finished length of the lug and is passed over the free end of one of the conductors, as the inner conductor 1. Said tube is then placed in a suitable press and pressed into the shape shown in the drawings, having an outside surface 5 which is substantially flat excepting for a water-conducting trough 9, side walls 6 and 7 being substantially perpendicular to said outside surface 5 and an inside surface 8.

The ends of the conductor 3 are gathered together into a single bundle and a similar conductive tube 11 is telescoped thereon. Said second tube is similarly shaped in a suitable press to provide an outside surface 13 which is substantially flat except for a longitudinal water-conducting trough 18, side walls 14 and 16 substantially perpendicular to said outside surface 13 and a flat inside surface 17. Both of said water-conducting troughs, appearing in the drawings, extend from the ends of the respective lugs adjacent to the cables for a distance of about one-half or two-thirds the length of the lugs.

Suitable binding and electrically conductive material, such as solder, is then introduced into the interior of each of said lugs, such as by dipping each of said lugs into molten solder. Preferably the lugs are first dipped into molten solder of relatively high temperature, such as about 600° F. in order to provide for the penetration of such solder to all surfaces of individual wires comprising the portion of the conductors and to the interior surface of the hollow lugs. This is then followed by further dipping into a solder of lower temperature to fill the entirety of the space between the individual wires comprising the conductors and the entire interior of each of the lugs to form same into a single solid mass.

The inner tubular member 2 is now cut back at the outer portions of its end to leave an insulative separator 21 extending between the lugs to a point 22 spaced a short distance, as about two inches, from the extremity of the lug.

At this point any excess solder which may be on the exterior of the lugs may be cleaned off by grinding, buffing or any convenient method.

The two coolant headers may now be applied as shown in the drawing. Each of said headers is identical with respect to each other and hence the description will be of one header with the understanding that the other header is identical therewith and that the numerals applied to the header described are equally applicable to the other header. The other header is indicated by the same numerals as the header described with the suffix "*a*" associated therewith.

The header 23 comprises a base member 26 extending along a portion of one lug, such as the lug 4 and substantially embracing one half thereof. Said base has flat coplanar surfaces 27 and 28 with a coolant groove 29 therebetween. Said surfaces 27 and 28 are adapted to lie immediately and snugly against the outer surface of the lug but preferably a generally U-shaped gasket 31 will be applied therebetween, the arms of the U extending on either side of the coolant grooves 9 and 29 in the lug and header base, respectively. At the axially outer end of the header base is a header end member 33 which extends radially beyond the base in both directions parallel with the adjacent surface 5 of the lug 4 and in all directions away from said lug surface 5. A suitably tapped coolant opening 39 is provided in said header end member 33 to which any convenient coolant conduit may be affixed. Said opening 39 communicates with the groove 29 in said header base. The bight portion of said coolant gasket 31 extends under the header end member 33 in order to completely seal the water passageway provided by the mated grooves 9 and 29 against leakage.

Coaxial openings 42 and 43 extend through both lugs 4 and 11 near their ends for receiving a bolt or other fastening means to hold said lugs in the usual manner to their connecting terminals, such as terminals of a welding transformer or terminals which are further connected to welding electrodes. In order to withstand the pressure normally imposed on the lugs by the means extending through said coaxial openings, a rigid and highly compression resistant separator 44 of electrically insulative material is provided between the ends of the lugs 4 and 11, said separator being also provided with an opening 46 therethrough which opening coincides with the openings 42 and 43 of the lugs.

With the headers 23 and 23*a* in position as shown, the outer tubing 48 can now be applied and drawn up to the position shown with its free end abutting against the shoulder surface 49 of an end header.

The ends 51 and 52 of the lugs are ground off smooth and preferably at a slight radius by any convenient means.

A passageway generally indicated at 40 (FIGURE 2) may be provided through the lug 4 essentially coaxial with and for joining the coolant openings 39 and 39a when it is desired to introduce cooling liquid into only one of said coolant openings and to suitably plug the other of said coolant openings. When it is desired to use both of the coolant openings 39 and 39a, the passageway 40 may be omitted.

The construction as described and illustrated provides a maximum amount of contact between the individual wires of the cables and the lugs respectively associated therewith whereby resistance between the surfaces of said lugs and the cable wires and consequent heat generation within said lugs is at a minimum.

Separation of said coolant headers from the conductor portions of said lugs is advantageous in that it permits said header to be made of different material than that of the contact portions of the lugs. For example, the contact portions of the lugs may be made of rolled copper, which has a high electrical conductivity, whereas the water header portions may be made of a harder material which is more suitable for threads than is copper. Thus, maximum conductivity is provided for the electrically conductive portions of the lugs whereas a much stronger means of cast construction is available for the coolant header portions to resist stripping of the threads at the connections thereof with the coolant pipes. Moreover, even if the threads in the coolant portions are damaged or worn, such portions can be readily separated from the conductor portions of the headers and replaced.

Placement of the entirety of the solder area within the lugs, instead of immediately behind the lugs as in some prior art structures, permits flexibility of the cable immediately behind the lug rather than having a rigid section immediately behind the lug. This is advantageous both in minimizing the length of the nonflexible portion of the final section and in relieving the structure for a concentration of bending forms at a narrow zone of the wire portion of the cable. These advantages, especially the last-named one, may be enhanced, if desired, by terminating the solder filling slightly before the inside ends of the copper tubes 4 and 11.

Further, this construction in providing a much lower heat generation than previous designs, provides a cable capable of much longer life than has been previously considered obtainable.

*Alternate Structure*

FIGURES 8 through 16 show a lug construction which is essentially bilaterally symmetrical. Therefore, parts having symmetrical conjugates will be described only once and the reference numerals which indicate said parts will, with the suffix "a" added, indicate said conjugates.

A first conductor, which in this embodiment constitutes a conventional wire rope of suitably conductive material such as copper, is here shown as consisting of three co-twisted strands separated by a resilient, elongated divider 66 which is of essentially Y-shaped cross section and which minimizes chafing between the strands. An electrically insulative and somewhat resilient sleeve 62 is arranged in telescoping relationship on and around said first conductor and extends to a point slightly beyond one end thereof.

A lug portion 63 is attached to said first conductor and consists, for approximately three-quarters of its length, of a solid bar of conductive material such as copper defining the rightward portion 64 of the lug portion 63. The side edges of the bar 64 is indicated at 67 and 68 are radially curved to define segments of a cylinder having its central axis slightly below and aligned with the axial center line of said bar for purposes appearing hereinafter. The bar 64 has, near its rightward end, a hole 69 therethrough by means of which said lug portion may be joined to a suitable terminal, not shown, such as a source of welding current or a welding head. The bar 64 has attached at its leftward end, a conductive, coaxial tubular member 71, the leftward end of which defines the leftward end of the lug portion 63. Said tubular member is of flattened cross-sectional shape adjacent the bar 64 and is preferably a smooth extension thereof. Near the middle of the tubular member 71 the top part thereof is slit transversely at 72 to allow the leftward portion 73 of said member 71 to be of increased height, said leftward part 73 of the tubular member 71 increasing in height toward its leftward end. The rightward end of the first conductor 61 is received into the tubular member 71, preferably so that its rightward end extends to the rightward extremity of the tubular member 71. Conveniently, said tubular member 71 and the conductor therewithin will be fastened together by crushing of the rightward portion 74 thereof around the conductor to shape the whole as above described. The resulting unit, comprised of the tubular member 71 and the rightward end of the conductor therewithin, is then fastened to the leftward end of the solid portion 64 in any convenient manner, as by silver soldering or welding.

The lug portion 63 has a water-conducting trough 76 extending axially along the top side thereof between the slit 72 and a point near the axial midpoint thereof for purposes appearing hereinafter. A water tube 77 of any convenient material is axially disposed between the leftward end of the water-conducting trough 76 and the leftward end of the lug portions 63 and is contained between the top wall of the tubular member 71 and the conductor 61. The water tube 77 is axially aligned with the water-conducting trough 76 for purposes appearing hereinafter. The bottom face of the lug portion 63 has a transverse groove 78 formed therein for purposes appearing hereinafter.

A coolant header 81, which may be constructed of any convenient material, preferably harder than the conductive material of the lug portion 63, has a base portion 82 the cross section of which is a chordal segment of a circle.

The base portion 82 has on its radially outer surface a circumferential ridge 91 for purposes appearing hereinafter. The planar bottom face of the base portion 82 is disposed upon and in substantial contact with the top surface of the lug portion 63 whereby the semicircular top wall of the base portion 82 forms a smooth co-radial continuation of the curved side walls 67 and 68 of the lug portion 63. The rightward end of the sleeve 62 extends past the leftward end of said base portion and closely surrounds the exterior surfaces of the lug portion 63 and base portion 82. The bottom face of the base portion 82 has a water conducting trough 83 formed therein an alignment with the trough 76 of the lug portion 63. The rightward end of the base portion 82 is preferably integral with a header end portion 84 which extends radially beyond the base member 82 radially outwardly of the lug portion 63. A tapped coolant opening 86 is provided in the circumferential face of the header end member 84 and communicates with the trough 83 in the base member 82 by means of an opening 37. The opening 86 may be connected to any convenient source, not shown, of liquid coolant and said coolant may be of any desired type such as water. A generally U-shaped seal groove 88 (FIGURE 5) is cut on the bottom face of the coolant header 81 and has its bight portion to the right of the opening 87 and has its arms extending radially outwardly and leftwardly therefrom to the edges of the bottom face of the header 81 and to the left of the mouth of the sleeve 62. A resilient sealing member 89 which may be of circular cross section is fixed in said seal groove for continuously contacting the upper surface of the lug portion 63 and for contacting at its ends the interior of the sleeve 62. Thus, the tight continuous contact of the end of the sleeve 62 with the exterior surfaces of the lug portion 63 and base member 82 and with the ends of the sealing member 89 and the continuous contact of the sealing member 89 with the adjacent surfaces of the lug portion 63 and the base member 82 prevents escape of liquid from the sleeve 62 and the troughs and openings feeding same.

A second cable 61a, a lug portion 63a attached thereto and coolant header 81a associated therewith are identical to, interrelated as, and act as symmetrical conjugates to the cable 61, the lug portion 63 and the coolant header 81 hereinabove described respectively. Said conjugates may be positioned in opposition to the first described parts whereby the bottom faces of the lug portion 63 and 63a are closely adjacent to one another and are separated by an insulating plate 92 for insulating said lug portions from each other electrically. Said insulating plate has a hole 93 therethrough which is identical in size to the holes 69 and 69a and in registry therewith. Said insulating plate also has a continuous resilient band, which may be a conventional O-ring 94, placed transversely thereon for acceptance in the transverse grooves 78 and 78a in the lug portion 63 and 63a whereby to assist in sealing the rightward end of the bottom faces of the lug portions 63 and 63a from coolant in the water-conducting troughs 76 and 76a. The leftward end of the insulating plate 92 abuts the adjacent portions of the sleeves 62 and 62a surrounding the conductors 61 and 61a.

An electrically insulative outer tube 96 jackets the sleeves 62 and 62a and closely surrounds the base portions 82 and 82a of the headers 81 and 81a whereby the rightward end of said outer tube abuts the leftward faces of the header end members 84 and 84a. Any suitable clamping means, such as the clamp 99, may be employed in conjunction with the beads 91 and 91a to retain the outer tube 96 in its position shown with respect to the headers 81 and 81a. The inner surface of the outer tube 96 thus lies in close continuous contact with the radially outer surface of the base portion 82, the side surfaces 67, 68, 67a and 68a of the lug portions 63 and 63a, and portions of the O-ring 94 near said side surfaces whereby said continuous contact, in conjunction with the arrangement of the sealing member 89, the O-ring 94, and the sleeves 62 and 62a described hereinafter, prevents escape of cooling liquid from the sleeves 62 and 62a to the open air.

As stated hereinabove, coolant liquid may be fed into the coolant openings 86 and 86a to travel through the passages defined by the troughs 83, 76, 83a and 76a, through the water tubes 77 and 77a, and into the sleeves 62 and 62a whereby said liquid contacts and cools the cables 61 and 61a. Said liquid may be discharged at the other end of the cable structure, as at the other end of the outer tube 96, by any convenient means desired such as by means of a cable termination construction identical to the one hereinabove described. The direction of the fluid flow may be reversed if desired.

An opening 98 may, if desired, be provided for the same purposes as the opening 40 in the form shown in FIGURES 1 to 7 but not in all cases essential as indicated in the above discussion of the embodiment of FIGURES 1 to 7. The hereinabove-described alternate structure when the opening 98 is omitted, maintains complete electrical insulation between the cables 61 and 61a at all times and there is no interaction between the liquid cooling the cable 61 and that cooling the cable 61a.

Thus, although the cable was designed to operate with a single water circuit, omission of the opening 98 enables it to operate with two isolated water circuits if desired.

It will be noted that the above-described construction has several novel features not found in the primary embodiment of this application nor in previously known art. Such features include the novel seal construction described hereinabove, the short extent of the cable 61 in the lug portion 63 and the solid construction of the bar 64 which in combination with features shared with the primary construction enable the alternate construction to meet most of the objects of the primary structure in a form which in some respects is more easily constructed.

As a further illustration of the versatility of the end construction of the present invention, attention is now directed toward the form of the invention shown in FIGURES 17 through 20. All of those parts shown in these figures which are identical with the parts shown in FIGURES 8 through 16, inclusive, are identified by primed numerals corresponding to the numerals used in FIGURES 8 through 16, inclusive. These constitute all portions of the lug construction excepting the separator means used for separating the conductors.

As to the separator means, this is indicated at 101 and is of generally cross shape with shaped guiding and sealing beads at the edge of each arm of the cross. More particularly, the separator 101 comprises a central section 102 from which radiates equally spaced arms 103, 104, 106 and 107. Each of these arms has a bead 108 at the outer edge thereof and each of said beads has an arcuate outer surface 109 shaped to conform to the inner surface of the casing 96'. Thus, the separator 101 defines four separate channels at 111, 112, 113 and 114 for the separate and independent conduction of suitable conductors 116, 117, 118 and 119, respectively. Water channels, of which four are indicated at 115a, 115b, 115c and 115d are also provided in the separator alongside all conductors.

Adjacent the lug members, however, the two arms which are between conductors of like polarity, as the arms 106 and 103, are cut off substantially adjacent the inner (leftward) ends of the lug portions 64' and 64a'. Beginning at the same location, the beads of the arms 104 and 107 separating conductors of opposite polarity are likewise removed and said arm is extended between the leftward ends of the lug portions to a point 110 adjacent the leftward end of the separator 92'.

As a still further possibility, the conductors can be arranged around the separator 101 in alternate polarity whereby to balance the mechanical forces developed therebetween upon energization thereof. In such case, however, the entire separator 101 will terminate at a point spaced from the lug structure 63'. Suitable tubular insulating members are, respectively, sleeved over each of the portions of the separate conductors which in this case extend beyond the separator 101 and conductors of like polarity are connected to appropriate lugs in the same manner as set forth above.

Although particular preferred embodiments of the invention have been disclosed above in detail for illustrative purposes, it will be understood that variations or modifications of such disclosure, which do not depart from the scope of the appended claims, are fully contemplated.

What is claimed is:

1. In an electrically conductive connecting cable, the combination comprising:

a pair of conductors and means electrically insulating said conductors from each other;

a band of conductive material circumferentially encircling the ends of each of said conductors and in electrical contact therewith;

means electrically insulating said bands from each other;

coolant headers independent of, and located outside of, said bands and arranged respectively on opposite sides of said bands;

a nonconductive casing arranged around said conductors and encircling at least a portion of said coolant headers, said casing being radially spaced from said bands and said coolant headers being disposed between said casing and said bands and a passageway from an exposed portion of said coolant headers extending therethrough to the interior of said casing.

2. A flexible conductor including a lug construction therefor, comprising the combination:

a pair of flexible conductors and means insulating same electrically from each other;

electrically conductive lug portions for the ends of each of said conductors comprising electrically conductive material transversely encircling said conductors and in electrical contact therewith;

each thereof having mutually facing surfaces and mutually remote surfaces;

means holding said lug portions adjacent, but electrically insulated from each other whereby said lug portions define a lug;

a pair of coolant headers each having a base portion including a surface at least partially engaging the adjacent surfaces of the adjacent lug portion and extending part way therealong, each coolant header having an end portion extending radially beyond said base portion to provide a shoulder at the end of said base portion;

said lug portions extending from within said coolant headers to points beyond said end portions of said coolant headers, said coolant headers being respectively arranged on and with respect to the lug portions so that the end portions thereof are remote from the conductors and the base portions thereof extend toward said conductors;

a flexible and resilient casing closely related to said conductors and also encircling the base portions of both said coolant headers and the section of the lug portions located therewithin;

openings through said headers extending from a portion thereof outside of said casing to a portion thereof communicating with said casing.

3. The device defined in claim 2 including a coolant groove in the inner side of each of the base portions of said headers.

4. The device defined in claim 3 including a coolant groove in the remote surface of each of said lug portions, said coolant groove in each said lug portion communicating with the coolant groove in the header respectively associated therewith.

5. The device defined in claim 2 including grooves in the inner surfaces of said base portions and the remote surfaces of the said lug portions, said pairs of grooves being respectively registered with each other and providing communication between the coolant opening in said exposed portion of said header to the interior of said casing.

6. The device defined in claim 2 wherein the conductors both extend to a point within said lug portions and constitute a portion of the structural base for at least one end of said lug portions.

7. The device defined in claim 2 wherein said lug portions include substantially solid members each having a socket extending into one end thereof and wherein the conductors extend respectively into the sockets of each of said members, said conductors being bonded in electrically conductive relationship to a wall of said sockets.

8. The device defined in claim 2 wherein said coolant headers are comprised of a material which is substantially harder than and is separable from said conductive lug portions.

9. An electric welding cable comprising a pair of elongated electrical conductors electrically insulated from each other;

an electrically conductive thin-walled tube surrounding, pressed into contact with and in electrically conductive engagement with the end portions of each of said conductors;

means holding said tubes adjacent but electrically insulated from each other whereby said tubes define a lug;

a pair of coolant headers independent of, and located outside of, said tubes, said coolant headers extending from a point intermediate the ends of said tubes toward the inner axial ends of said tubes, each of said headers partially encircling one of said tubes and each thereof having a coolant passage therein and an insulating casing surrounding said conductors and encircling and secured to said coolant headers, said coolant headers being disposed between said tubes and said casing and maintaining same spaced from each other.

10. An electric welding cable according to claim 9 including a sealing member disposed between each of said tubes and the coolant header associated therewith.

11. An electric welding cable comprising a first conductor and an insulating sleeve surrounding said first conductor;

a second conductor arranged around said sleeve;

the end portions of said conductors being arranged so that they are adjacent each other in layered relationship but are electrically insulated from each other;

electrically conductive, elongated, tubular members sleeved over the end portions of said conductors and bonded to said conductors so as to be in electrical contact therewith, said tubular members being electrically insulated from each other;

a pair of coolant headers independent of said tubular members and arranged in opposed relationship to each other, each of said coolant headers lying against one of said tubular members and each having a coolant passageway therein, one of said coolant passageways communicating with the interior of said sleeve and the other communicating with the space around said sleeve;

and an insulating casing surrounding said second conductor and encircling and secured to said coolant headers.

12. An electric welding cable comprising:

a pair of electrical conductors and means electrically insulating same from each other;

electrically conductive lug portions arranged at the ends of said conductors and means holding said lug portions adjacent to but electrically insulated from each other whereby said lug portions define a lug;

coolant header means separate from and located outside of said lug portions and each including a portion lying adjacent said respective lug portions and extending therealong;

a flexible insulating casing surrounding said conductors and said portion of said coolant header means, said casing being radially spaced from said lug portions, said coolant header means being disposed between said casing and said lug portions and holding same in spaced relation.

13. An electric welding cable according to claim 12, in which said lug portions have substantially flat, mutually adjacent and remote surfaces, said remote surfaces each having a depression formed thereon, said coolant header means comprising a pair of opposed coolant header elements which are respectively contiguous with said remote surfaces of said lug portions, said coolant header elements each having a groove therein which is in registry with the depression in the lug portion adjacent thereto to define a passage for coolant.

14. An electric welding cable comprising:

a first conductor;

a second conductor alongside said first conductor;

means separating said conductors from each other;

the end portions of said conductors being arranged so that they are adjacent each other in layered relationship with each other;

first and second electrically conductive and elongated lug members having flattened tubular ends sleeved over the end portions of said first and second conductors, respectively, and bonded to said conductors so as to be in electrical contact therewith;

interposed means insulating said lug members from each other;

first and second coolant headers independent of said lug members and arranged in opposed relationship to each other, each of said coolant headers being disposed upon one of said lug members and each having a coolant passageway therein, said coolant passageway in said first coolant header communicating with the zone occupied by said first conductor and said coolant passageway in said second coolant header communicating with the zone occupied by said second conductor;

an insulating casing surrounding said conductors and encircling and secured to said coolant headers; and resilient sealing means sealingly disposed between said coolant headers and said lug members axially outwardly of said coolant passageways and having ends contacting the inner surface of said casing whereby coolant leakage from said passageways toward said lugs is prevented.

15. An electric welding cable comprising:

first and second conductors, the end portions of said conductors being arranged so that they are adjacent each other in layered relationship;

first and second electrically conductive and elongated lug members having flattened tubular ends sleeved over the end portions of said first and second conductors, respectively, and bonded to said conductors so as to be in electrical contact therewith;

first and second coolant headers independent of said lug members and arranged in opposed relationship to each other, each of said coolant headers being disposed upon one of said lug members and each having a coolant passageway therein, said coolant passageway in said first coolant header communicating with the zone occupied by said first conductor and said coolant passageway in said second coolant header communicating with the zone occupied by said second conductor;

an insulating casing surrounding said conductors and encircling and secured to said coolant headers;

resilient sealing means sealingly disposed between said coolant headers and said lug members axially outwardly of said coolant passageways and having portions contacting opposed inner surfaces of said casing whereby coolant leakage from said passageways is prevented.

16. The device of claim 15 wherein:

an insulating plate is disposed between and in contact with said lug members;

said lug members having a transverse groove formed in the faces thereof in contact with said insulating plate, in radial alignment with each other and positioned axially outwardly of said coolant passageways; and a resilient ring lying within said groove and transversely surrounding said insulating plate, said ring also contacting the inner surface of said insulating casing whereby coolant within said casing is prevented from escaping.

17. The device defined in claim 2 wherein said lug portions each include a first portion comprising a solid electrically conductive material and a second portion comprising a tube surrounding an end of a conductor, said tube being crushed around said conductor to a cross-sectional size and shape at least generally similar to the corresponding size and shape of said first portions, said first and second portions being bonded together in electrically conductive relationship to each other.

References Cited in the file of this patent

UNITED STATES PATENTS

| 2,504,777 | Wreford | Apr. 18, 1950 |
| 2,702,311 | Botterill et al. | Feb. 15, 1955 |
| 2,835,721 | Leathers | May 20, 1958 |
| 2,888,510 | Tribe | May 26, 1959 |